United States Patent [19]

Höfer et al.

[11] Patent Number: 4,525,525
[45] Date of Patent: Jun. 25, 1985

[54] USE OF BIS-SEMIESTERS OF SULFOSUCCINIC ACID WITH POLYETHER DIOLS BASED ON ETHYLENE OXIDE/PROPYLENE OXIDE OR THEIR SALTS AS SURFACE-ACTIVE AGENTS

[75] Inventors: Rainer Höfer, Duesseldorf; Bernhard Bartnick, Monheim-Baumberg, both of Fed. Rep. of Germany

[73] Assignee: Henkel Kommanditgesellschaft (Henkel KGaA), Duesseldorf, Fed. Rep. of Germany

[21] Appl. No.: 594,087

[22] Filed: Mar. 28, 1984

[30] Foreign Application Priority Data

Mar. 30, 1983 [DE] Fed. Rep. of Germany ....... 3311601

[51] Int. Cl.³ .......................... C08K 5/41; C08L 25/06
[52] U.S. Cl. ..................................... 524/742; 252/351; 524/157; 524/800; 524/804
[58] Field of Search ................. 252/351; 524/157, 742, 524/800, 804

[56] References Cited

U.S. PATENT DOCUMENTS

| | | |
|---|---|---|
| 3,329,640 | 7/1967 | Scotti et al. ........................... 524/748 |
| 4,148,746 | 4/1979 | Klemmensen et al. .............. 524/157 |
| 4,206,074 | 6/1980 | Perner ................................... 252/351 |
| 4,253,999 | 3/1981 | Okishi ................................... 524/157 |
| 4,276,054 | 6/1981 | Schmolka et al. ................... 252/351 |
| 4,340,382 | 7/1982 | Morlino et al. ...................... 252/351 |
| 4,421,660 | 12/1983 | Solc nee Hajna ................... 524/800 |

FOREIGN PATENT DOCUMENTS

| | | |
|---|---|---|
| EP51878 | 5/1982 | European Pat. Off. ............ 252/351 |
| 2041388 | 9/1980 | United Kingdom . |

OTHER PUBLICATIONS

Chemical Abstracts, vol. 85, No. 22, Nov. 29, 1976, abstract 85:162327u.

*Primary Examiner*—Ronald W. Griffin
*Attorney, Agent, or Firm*—Ernest G. Szoke; Henry E. Millson, Jr.; Mark A. Greenfield

[57] ABSTRACT

Bis-semiesters of sulfosuccinic acid with polyether diols based on ethylene oxide/propylene oxide and/or their alkali metal and/or ammonium salts as surfactants, i.e., agents for reducing the surface tension of aqueous substrates such as water or aqueous solutions, as dispersants, wetting agents and leveling agents. Another aspect of the invention relates to the use of such bis-semiesters and/or such salts as emulsifiers in the emulsion polymerization of water insoluble monomers.

17 Claims, No Drawings

USE OF BIS-SEMIESTERS OF SULFOSUCCINIC ACID WITH POLYETHER DIOLS BASED ON ETHYLENE OXIDE/PROPYLENE OXIDE OR THEIR SALTS AS SURFACE-ACTIVE AGENTS

This invention relates to bis-semiesters of sulfosuccinic acid with polyether diols based on ethylene oxide/propylene oxide and/or certain salts thereof and their use as surfactants in aqueous media, more particularly as dispersants, emulsifiers, wetting agents or leveling agents.

BACKGROUND OF THE INVENTION

Numerous surface-active agents are already known. They are used in many branches of industry for wetting solid surfaces with aqueous solutions or for dispersing liquids and/or solids in water. Thus, ethylene oxide/propylene oxide-based polyether diols synthesized from discrete polypropylene oxide and polyethylene oxide blocks are used in this field. Although products such as these are used for numerous applications, they can only be used to a limited extent at most in emulsion polymerization. In the field of emulsion polymerization there is an ongoing search for new surface-active agents which have favorable properties for the preparation of the emulsion; for the emulsion polymerization process; and especially with respect to the properties of the polymer latex formed by the polymerization process. In general, those skilled in this art are unable to use the chemical structure of a surface-active agent to predict its properties as a polymerization emulsifier. In industrial terms, particularly valuable emulsifiers are those which, through emulsion polymerization, make it possible to obtain finely divided, coagulate-free foam-poor latices which can be dried to form substantially water-resistant polymer films or compositions.

DESCRIPTION OF THE INVENTION

The essence of the present invention relates to the use of certain derivatives of polyether diols based on ethylene oxide/propylene oxide as surface-active agents. More particularly, the present invention relates to the use of substances such as these as dispersants, emulsifiers, wetting agents or leveling agents, and especially as emulsifiers for emulsion polymerization.

Accordingly, one aspect of the present invention relates to the use of bis-semiesters of sulfosuccinic acid with polyether diols based on ethylene oxide and propylene oxide and/or their alkali metal and/or ammonium salts for reducing the surface tension of materials such as water or aqueous solutions.

Bis-sulfosuccinic acid semiesters of polyether diols based on ethylene oxide/propylene oxide are already known. Hitherto, they have been used as liquefiers (structure breakers) for highly concentrated surfactant solutions. It is assumed that the suitability of these materials for this use is attributable to their ability to disrupt the formation of micelles in highly concentrated surfactant solutions. In contrast, however, the formation of micelles in aqueous solutions is the characteristic property of surface-active agents. Accordingly, it was wholly unexpected to find that these products, which are known for their micelle-disrupting properties, could be used as surface-active agents, i.e., as micelle formers. In addition, these products used in accordance with the invention depart from the normal hydrophilic/hydrophobic structure of emulsifiers because, at both ends of the chain, they contain hydrophilic groups capable of forming ions.

The compounds used herein as surface-active agents contain as the central moiety a polyether diol of which the terminal hydroxyl groups have each been reacted to form sulfosuccinic acid esters. Although it is desirable for semiester groups to be present at both ends of the chain, the expression "bis-sulfosuccinic acid semiesters" (=bis-semiesters of sulfosuccinic acid) in the context of the invention also includes mixtures thereof which contain at most 30% and preferably at most 10% of monosulfosuccinic acid semiesters of polyether diols or sulfosuccinic acid esters.

The products used in accordance with the invention are produced from polyether diols based on ethylene oxide/propylene oxide. It is preferred to use polyether diols having a molecular weight (number average) of from about 400 to about 20,000, preferably from about 1000 to about 15,000 and, more preferably, from about 2000 to about 10,000. So far as the use according to the invention is concerned, it is important that the polyether diols contain both ethylene oxide and also propylene oxide units, preferably present in the form of blocks. Preferred are those block copolymers containing from about 15 to about 90 mole percent of units derived from ethylene oxide and preferably from about 30 to about 80 mole percent of units derived from ethylene oxide. Products suitable for use in accordance with the invention are fully soluble in water at the polymerization temperature. As alkali or ammonium salts, they have a cloud point (as determined in accordance with DIN 53 917) of more than about 60° C. and preferably of more than about 80° C.

It is possible to use block copolymers consisting of only two blocks. However, it is also possible to use multiblock copolymers, more particularly triblock copolymers. Block copolymers of ethylene oxide and propylene oxide are already known and are described, for example, by N. Schonfeldt in the book entitled "Grenzflachenaktive Ethylen-oxidaddukte" (Surface-Active Ethylene Oxide Adducts)", Stuttgart 1976, pages 53 et seq.

The compounds used in accordance with the invention are easy to prepare. To this end, ethylene oxide/propylene oxide-based polyether diols having the described properties are reacted with from about 1.5 to about 2.5 moles and preferably from about 1.9 to about 2.2 moles of maleic acid anhydride at temperatures in the range of from about 95 to about 110° C. Ammonium and/or alkali metal sulfites or hydrogen sulfites or pyrosulfites are added onto the bis-maleic acid semiesters thus formed in the presence of water with reaction of the C-C double bond. To this end, ammonium and/or alkali metal sulfites or hydrogen sulfites or pyrosulfites are used in a quantity of from about 0.95 to about 1.5 and preferably in a quantity of from about 1.05 to about 1.2 equivalents, based on the maleic acid semiester groups. The reaction temperature is in the range of from about 20 to about 100° C., and preferably in the range of from about 50 to about 90° C. The reaction products are composed of aqueous solutions or dispersions of their alkali metal or ammonium salts. They may be used as such for the purposes of the invention, i.e., no further purification or work-up is necessary.

In a first embodiment of the invention, the described sulfosuccinic acid semiesters are used as wetting agents. According to the invention, they considerably reduce the surface tension of water in concentrations of from about 0.01 to about 30% by weight, and preferably in concentrations of from about 0.5 to about 3% by weight. In this way, it is possible to wet surfaces of solids with water or aqueous solutions and thus to remove impurities or to apply other substances thereto. Thus, even solid surfaces having complicated structures, for example, surfaces of wood, metals and textiles, can be wetted or impregnated with complete displacement of the air. In this way, it is possible to apply adjuvants such as, for example, flameproofing salt solutions, insecticides or fungicides, wood preservatives, and dyes. In addition, the sulfosuccinic acid semiesters are suitable for use as wetting agents in pesticides.

In another embodiment of the invention, the sulfosuccinic acid semiesters of the invention can be used for the preparation of dispersions of finely divided inorganic salts or oxides. The sulfosuccinic acid semiesters are suitable, for example, as pigment dispersers for dispersing pigments such as titanium dioxide, iron oxide, or calcites in water.

In another embodiment of the invention, the sulfosuccinic acid semiesters of the invention are suitable for use as leveling agents. In this instance, they are used for wetting textile fibers with dye solutions, particularly aqueous dye solutions, and in this way promote attachment of the dyes to the fibers. At the same time, uneven dyeing and patchiness of the dyed product are avoided.

In another embodiment of the invention, the bis-sulfosuccinic acid semiesters of ethylene oxide/propylene oxide-based polyether diols are used as emulsifiers. By virtue of their high hydrophilicity attributable to having acid groups at both ends of the chain, the semiesters in question represent highly hydrophilic emulsifiers. Accordingly, it is possible to prepare primarily emulsions of the oil-in-water type. In this context, the term oil includes any liquid which is not infinitely miscible with water. According to the invention, a variety of different oils can be emulsified in water using the above bis-sulfosuccinic acid semiesters. Thus, liquid, straight-chain or branched or cyclic aliphatic hydrocarbons, for example, can be used as the oil phase. According to the invention, aromatic hydrocarbons can also be emulsified in water. Aliphatic hydrocarbons containing functional groups can also be used as the oil phase. Thus, it is possible to emulsify esters of long-chain acids, for example, fatty acid esters, or long-chain alcohols, for example, fatty alcohols, in water in accordance with the invention. Particularly suitable oil phases are esters of unsaturated acids with $C_1$–$C_{10}$–alcohols. Other suitable oil phases are halogenated, aliphatic hydrocarbons, particularly unsaturated, halogenated aliphatic hydrocarbons.

A variety of phase ratios (oil phase to water phase) can be used in the preparation of oil-in-water emulsions in accordance with the invention using the bis-sulfosuccinic acid semiesters. Thus, the quantity of the oil phase can amount to between about 1 and about 70% by weight, based on the emulsion as a whole. It is possible to prepare both emulsions of low oil content, i.e., between about 1 and about 30% by weight, preferably between about 5 and about 20% by weight, and also emulsions of high oil content, i.e., emulsions containing more than about 40% by weight, or more than about 50% by weight of oil phase. In this connection, the adjuvants used in the preparation of emulsions and known to those skilled in this art, such as thickeners or electrolytes, can be used in the usual way.

In one particular embodiment, the invention relates to the use of the bis-sulfosuccinic acid semiesters as emulsifiers in the emulsion polymerization of water-insoluble monomers. Thus, it is advantageous to use the bis-sulfosuccinic acid semiesters as emulsifiers for the polymerization of aromatic vinyl compounds, such as styrene or methyl styrene, vinyl halides, such as vinyl chloride or vinylidene chloride, vinyl esters, such as vinyl acetate, vinyl amides, $\alpha$, $\beta$-unsaturated carboxylic acids, such as acrylic acid or methacrylic acid, their esters with $C_1$–$C_{10}$ and preferably $C_1$–$C_4$–alcohols, their amides, their nitriles and/or diolefins, such as butadiene or isoprene.

The bis-sulfosuccinic acid semiesters are used in quantities of from about 0.01 to about 5% by weight, based on the emulsion as a whole, for emulsion polymerization. They are preferably used in quantities of from about 1 to about 3% by weight. A variety of emulsion polymerization processes can be used. Thus, the total quantity of emulsifier can be initially introduced in aqueous solution. On the other hand, it is also possible to add the emulsifier continuously or in several portions during polymerization. According to the invention, it is also possible to carry out emulsion polymerization processes in which a preemulsion is formed from water and monomers and introduced into the reaction vessel either continuously or in portions. The emulsion polymerization reaction can be carried out in a neutral, alkaline or acid medium. However, the pH-values are preferably above about 3 and, more particularly, in the range of from about 4 to about 8, at which the substances used in accordance with the invention are present at least partly in salt form. Accordingly, it is preferred to use the bis-sulfosuccinic acid semiesters at least partly in the form of ammonium and/or alkali metal salts. The sodium salts are particularly suitable.

The bis-sulfosuccinic acid semiesters used in accordance with the invention are compatible with normal polymerization adjuvants. Thus, it is possible to use the polymerization initiators, polymerization accelerators or molecular weight regulators normally used for emulsion polymerization. Other emulsifiers, particularly non-ionic emulsifiers or anionic emulsifiers, can be used together with the bis-sulfosuccinic acid semiesters in quantities which, on their own, would not be sufficient for emulsion polymerization. However, this is not essential because the bis-sulfosuccinic acid semiesters are distinguished by the fact that they give excellent results as sole emulsifiers in the preparation of polymer dispensions.

The use of the bis-sulfosuccinic acid semiesters of ethylene oxide/propylene oxide-based polyether diols in accordance with the invention makes it possible to produce coagulate-free and particularly finely divided polymer dispersions. The dispersions thus produced are low-foam dispersions, enabling gaseous residual monomers to be removed, and show high stability, even when stored under adverse conditions. In addition, films or polymer compositions produced from the dispersions absorb very little water, which is desirable for numerous applications.

The invention is illustrated but not limited by the following Examples. The production of the products used according to the invention is described in Examples A through C. Examples D through G are Comparison Examples.

EXAMPLES 1.0 Production of bis-sulfosuccinic acid semiesters
1.1 Ethylene oxide (EO)/propylene oxide (PO)-based polyether diols used:
  A an EO/PO-block copolymer containing approximately 80 mole percent of EO in the molecule, OH number 24.7;
  B an EO/PO block copolymer containing approximately 50 mole percent of EO in the molecule, OH number 52.0;
  C an EO/PO-block copolymer containing approximately 40 mole percent of EO in the molecule, OH number 72.1;
  D an EO/PO-block copolymer containing approximately 10 mole percent of EO in the molecule, OH number 88;
  E polypropylene glycol, molecular weight 2020;
  F polyethylene glycol, molecular weight 1550;
  G polyethylene glycol, molecular weight 3000.

1.2 Method

The quantities of polyether diol and maleic acid anhydride given in Table 1 below were initially introduced into a reaction vessel equipped with a stirrer, reflux condenser, dropping funnel, thermometer and gas inlet pipe, after which the reaction vessel was purged with nitrogen. The reaction mixture was heated with vigorous stirring to 105° C. and kept at that temperature for 2 hours. It was then cooled to 75° C. After the indicated quantity of sodium sulfite in aqueous solution had been added, the mixture was kept at a temperature of 75° to 80° C. until the sulfiting reaction was over (after about 2 hours). Since maleic acid anhydride shows a tendency toward sublimation, it is of advantage to carry out the reaction in a pressure vessel under an excess pressure of from 0.2 to 1 bar of nitrogen or air. It is also known that, at these temperatures (40° to 80° C.), the reaction can be carried out in the presence of from 0.1 to 1.0% of alkali hydroxide as catalyst. This can be employed in the present process also.

TABLE 1

Starting materials used for the production of bis-sulfosuccinic acid semiesters of polyether diols

| | | Examples | | | | | | |
|---|---|---|---|---|---|---|---|---|
| | | A | B | C | D | E | F | G |
| EO/PO based polyether diol | A | 655 g | — | — | — | — | — | — |
| | B | — | 634 g | — | — | — | — | — |
| | C | — | — | 560 g | — | — | — | — |
| | D | — | — | — | 427 g | — | — | — |
| | E | — | — | — | — | 614 g | — | — |
| | F | — | — | — | — | — | 582 g | — |
| | G | — | — | — | — | — | — | 652 g |
| Maleic acid anhydride | | 30 g | 58 g | 72 g | 66 g | 60 g | 74 g | 43 g |
| Sodium sulfite | | 40 g | 75 g | 93 g | 85 g | 81 g | 100 g | 58 g |
| Water | | 725 g | 733 g | 725 g | 557 g | 745 g | 744 g | 747 g |

TABLE 2

Properties of the bis-sulfosuccinic acid semiesters of polyether diols in the form of their sodium salts

| | Examples | | | | | | |
|---|---|---|---|---|---|---|---|
| Analysis: | A | B | C | D | E | F | G |
| Dry residue, % by weight | 50 | 47.3 | 49.8 | 46.0 | n.d. | 49.6 | 50.1 |
| Acid number | 6.0 | 4.7 | 10 | 9.9 | n.d. | 6.1 | 8.4 |
| Inorganic sulfate, % by weight | 0.2 | 0.2 | 0.1 | 0.1 | n.d. | 0.2 | 0.2 |
| Inorganic sulfite, % by weight (as $SO_2$) | 0.11 | 0.02 | 0.11 | 0.07 | n.d. | 0.02 | 0.05 |
| Org. bound sulfonate (Epton) | 1.0 | 1.7 | 2.4 | 2.2 | n.d. | 1.75 | 0.66 |
| Appearance | clear, liquid | clear, liquid | clear, liquid | clear, liquid | cloudy, phase separation | clear, liquid | clear, liquid |
| Cloud point | >80 | >80 | >80 | 38 | n.d. | >80 | >80 |
| Solubility in water at 25° C. | | clearly soluble in any ratio | | | insoluble | soluble in any ratio | |

2.0 Use of bis-sulfosuccinic acid semiesters of polyether diols as emulsifiers in emulsion polymerization.

The use of the compounds as described in Examples A through C in accordance with the invention in emulsion polymerization is described in Examples 1 through 3. Sulfosuccinic acid semiesters which do not correspond to the invention, i.e., those produced as described in Examples D and E, are used for comparison in Examples 4 and 5.

Non-ionic EO/PO block polymers and a conventional anionic emulsifier are also tested for comparison in Examples 6 and 7 and in Example 8, respectively.

In Examples 1 through 3 according to the invention, no coagulate is formed during polymerization. The latices form hardly any foam and show the lowest water uptake values.

2.1 Polymerization Procedure

Apparatus

The emulsion polymerization reaction was carried out in the absence of pressure in a 2-liter glass autoclave equipped with an anchor stirrer.

Formulation

Vinyl acetate/isodecanoic acid vinyl ester copolymer (ratio by weight 70:30).

Quantity of emulsifier used 2.5% by weight, based on monomer.

Reactor charge 256.0 g of deionized water
6.0 g of emulsifer, 100%
0.5 g of potassium peroxydisulfate
0.5 g of borax
pH-value of the reactor mixture 7–8

Charge of the metering vessels

Mixture I
  243.0 g of deionized water 6.0 g of emulsifier, 100% 2.0 g of potassium peroxydisulfate 2.0 g of borax Mixture II
  340.0 g of vinyl acetate
  144.0 g of isodecanoic acid vinyl ester
  4.0 g of acrylic acid Mixtures I and II are emulsified in the metering vessel; the pre-emulsion had a pH-value of approximately 4.0.

To carry out the emulsion polymerization reaction, the reaction vessel was first charged with the reaction components indicated above. Thereafter an emulsion was prepared from Mixtures I and II in the metering vessel and introduced over a period of 2 hours into the nitrogen-purged reaction vessel at a temperature of 80° C. The reaction product was then cooled to room temperature, followed by testing.

Test Methods

1. Dry residue content

Sartorius Type 709301 balance for determining dry residues. The solids content was determined at stage 7 after a drying time of 20 minutes. The quantity weighed was approximately 5 g. 2. Coagulate content after production The prepared dispersion was passed through a tared Perlon filter bag (a product of the Schwegmann Company, mesh width 80 microns). The filter bag with any coagulate present was dried for 24 hours at 105° C. and the coagulate determined by differential weighing.

3. Determination of particle size

Particle size was visually determined on the following scales:

milky-white dispersion = above 1 micron
bluish-white to brownish-white dispersion = 1 micron to 0.1 micron
gray-white, semi-transparent dispersion = 0.1 micron to 0.05 micron
substantially transparent = below 0.05 micron.

4. pH-value

The pH-value was determined by means of a standard commercially available pH-meter.

5. Mechanical stability 80 g of the dispersion was stirred for 30 minutes at 14,000 r.p.m. in a type 5 UB 2 Klaxon stirrer and subsequently filtered through a Schwegmann filter bag (mesh width 80 microns). The coagulate content was determined by drying and differential weighing of any coagulate remaining in the filter bag (in accordance with ASTM D 1076).

6. Viscosity

Viscosity was measured at 25° C. by means of a Brookfield type RVT viscosimeter.

7. Determination of percentaqe water uptake and swelling Water uptake

Three dispersion films measuring 75×35×0.5 mm were tested. The films were characterized, dried for 48 hours at 50° C. in a recirculating air oven, subsequently weighed and then stored in deionized water. Depending on requirements, the dispersion films were carefully dried by dabbing with cellulose cloths after storage in water for 24 hours, 48 hours, or longer, subsequently weighed and the increase in weight calculated in percent.

Swelling

The percentage swelling value was calculated in accordance with the following equation: % swelling = % by weight water uptake × density of the polymer dispersion.

8. Film Assessment

Two films were cast using a drawing rule (gap height approximately 1 mm). One film was dried for 48 hours at room temperature and the other for 24 hours at 105° C.

9. Resistance to Freezing and Thawing

Quantities of approximately 50 g of the dispersion were introduced into 50 ml wide-necked bottles and frozen for about 16 hours at −5 to −10° C. and then thawed again for about 8 hours at room temperature (= 1 cycle). This treatment was repeated until the same coagulated or for a maximum of 5 cycles. The result is expressed as coagulation after X cycles at the temperatures indicated.

| Example No. | Emulsifier (Quantity used in % by weight, based on monomer) | % dry residue | % coagulate during polymerization | Particle size of the dispersion in microns | pH-value | Mechan. stability (Klaxon method) at pH 0.7 mins. | % coagulate |
|---|---|---|---|---|---|---|---|
| Invention | | | | | | | |
| 1 | 2.5% of the emulsifier of Example A | 49.6 | 0 | <0.1 | 4.3 | 30 | 0 |
| 2 | 2.5% of the emulsifier of Example B | 49.5 | 0 | <0.1 | 4.5 | 30 | 0 |
| 3 | 2.5% of the emulsifier of Example C | 49.5 | 0 | <0.1 | 4.5 | 30 | 0 |
| Comparison | | | | | | | |
| 4 | 2.5% of the emulsifier of Example D | n.d. | 100 | n.d. | n.d. | n.d. | n.d. |
| 5 | 2.5% of the emulsifier of Example F | 46.6 | 5 | 0.1–1 | 4.2 | 30 | 0 |
| 6 | 2.5% of EO/PO-block copolymer containing approximately 50% of EO in the molecule (esterification component B) | 47.0 | 5 | 0.1–2 | 4.2 | 30 | 0 |
| 7 | 2.5% of EO/PO-block copolymer | 46.0 | 5–10 | 0.1–2 | 4.1 | 30 | 0 |

-continued

| Example No. | | | | | | | |
|---|---|---|---|---|---|---|---|
| 8 | containing approximately 40% of EO in the molecule (esterification component C) dodecyl benzene sulfonate, Na salt | 49.0 | 0.2 | <0.1 | 4.2 | 3 | foam |

| Example No. | Emulsifier, quantity used in % (AS 100%, based on monomer) | Brookfield viscosity at 25° C. in mPa.s | Water uptake and swelling | | Film assessment | |
|---|---|---|---|---|---|---|
| | | | % water | % swelling | at room temperature | at 105° C. |
| Invention | | | | | | |
| 1 | 2.5% of the emulsifier of Example A | 110 | 12.3 | 13.1 | colorless, clear | yellowish, clear |
| 2 | 2.5% of the emulsifier of Example B | 140 | 14.0 | 14.8 | colorless, clear | yellowish, clear |
| 3 | 2.5% of the emulsifier of Example C | 100 | 17.0 | 18.0 | colorless, clear | yellowish, clear |
| Comparison | | | | | | |
| 4 | 2.5% of the emulsifier of Example D | n.d. | n.d. | n.d. | n.d. | n.d. |
| 5 | 2.5% of the emulsifier of Example F | 20 | 22.0 | 23.3 | colorless, clear | yellowish, clear |
| 6 | 2.5% of EO/PO-block copolymer containing approximately 50% of EO in the molecule (esterification component B) | 20 | 20.9 | 22.2 | colorless, clear | yellowish, clear |
| 7 | 2.5% of EO/PO-block copolymer containing approximately 40% of EO in the molecule (esterification component C) | 20 | 29.7 | 31.5 | colorless, clear | yellowish, clear |
| 8 | dodecyl benzene sulfonate, Na salt | 170 | 18.5 | 19.6 | colorless, clear | red-brown clear |

| Example No. | Emulsifier, quantity used in % (AS 100%, based on monomer) | Resistance to freezing/thawing | | | | Stability in Storage | |
|---|---|---|---|---|---|---|---|
| | | −5° C. | | −10° C. | | | |
| | | cycle | % coagulate | cycle | % coagulate | months | % coagulate |
| Invention | | | | | | | |
| 1 | 2.5% of the emulsifier of Example A | 5 | 0 | 1 | 100 | 6 | 0 |
| 2 | 2.5% of the emulsifier of Example B | 5 | 0 | 1 | 100 | 6 | 0 |
| 3 | 2.5% of the emulsifier of Example C | 5 | 0 | 1 | 100 | 6 | 0 |
| Comparison | | | | | | | |
| 4 | 2.5% of the emulsifier of Example D | n.d. | n.d. | n.d. | n.d. | n.d. | |
| 5 | 2.5% of the emulsifier of Example F | 5 | 0 | 1 | 80 | 3 | 10 |
| 6 | 2.5% of EO/PO-block copolymer containing approximately 50% of EO in the molecule (esterification component B) | 5 | 0 | 5 | 0 | 4 | 40 |
| 7 | 2.5% of EO/PO-block copolymer containing approximately 40% of EO in the molecule (esterification component C) | 5 | 0 | 5 | 0 | 3 | 50 |
| 8 | dodecyl benzene sulfonate, Na salt | 5 | 0 | 1 | 100 | 6 | 0 |

What is claimed is:

1. A process for reducing the surface tension of an aqueous medium which comprises adding to said medium an effective amount of at least one compound selected from the group consisting of (a) a bis-semiester of sulfosuccinic acid with a polyether diol based on ethylene oxide and propylene oxide; (b) an alkali metal salt of such bis-semiester; and (c) the ammonium salt of such bis-semiester.

2. The process of claim 1 in which the aqueous medium is water or an aqueous solution.

3. The process of claim 1 in which the polyether diol moiety has a number average molecular weight in the range of from about 400 to about 20,000.

4. The process of claim 3 in which the polyether diol moiety has a number average molecular weight in the range of from about 1,000 to about 15,000.

5. The process of claim 4 in which the polyether diol moiety has a number average molecular weight in the range of from about 2,000 to about 10,000.

6. The process of claim 1 in which the polyether diol moiety comprises an ethylene oxide/propylene oxide block copolymer containing from about 15 to about 90 mole percent of ethylene oxide units and containing two terminal hydroxyl groups.

7. The process of claim 6 in which the block copolymer contains from about 30 to about 80 mole percent of ethylene oxide units.

8. The process of claim 1 in which the effective amount of said compound ranges from about 0.01 to about 30 percent by weight.

9. The process of claim 8 in which the effective amount ranges from about 0.5 to about 3% by weight.

10. An emulsion of a polymer of at least one water insoluble monomer, water and an effective amount of at least one emulsifier selected from the group consisting of (a) a bis-semiester of sulfosuccinic acid with a polyether diol based on ethylene oxide and propylene oxide; (b) an alkali metal salt of such bis-semiester; and (c) the ammonium salt of such bis-semiester.

11. The emulsion of claim 10 in which the water insoluble monomer is at least one of the following: an aromatic vinyl compound; a vinyl halide; a vinyl ester; a vinyl amide; an $\alpha,\beta$-unsaturated carboxylic acid or an ester, amide, or nitrile of such acid; and a diolefin.

12. The emulsion of claim 10 in which the emulsifier is present in an amount of from about 0.01 to about 5% by weight based upon the weight of the emulsion.

13. The emulsion of claim 12 in which the emulsifier is present sent in an amount of from about 1 to about 3% by weight.

14. In a process for the emulsion polymerization of water insoluble monomers, the improvement which comprises using as an emulsifier at least one compound selected from the group consisting of (a) a bis-semiester of sulfosuccinic acid with a polyether diol based on ethylene oxide and propylene oxide; (b) an alkali metal salt of such bis-semiester; and (c) the ammonium salt of such bis-semiester.

15. The process of claim 14 in which the water insoluble monomers are at least one of the following: aromatic vinyl compounds; vinyl halides; vinyl esters; vinyl amides; $\alpha,\beta$unsaturated carboxylic acids or esters, amides, or nitriles of such acids; and diolefins.

16. The process of claim 14 in which the emulsifier is present in an amount of from about 0.01 to about 5% by weight based upon the weight of the emulsion.

17. The process of claim 16 in which the emulsifier is present in an amount of from about 1 to about 3% by weight.

* * * * *